US008830398B2

(12) United States Patent
Inoue et al.

(10) Patent No.: US 8,830,398 B2
(45) Date of Patent: Sep. 9, 2014

(54) RESOLUTION DETERMINATION DEVICE, IMAGE PROCESSOR, AND IMAGE DISPLAY DEVICE

(71) Applicant: Panasonic Corporation, Osaka (JP)

(72) Inventors: Koichi Inoue, Osaka (JP); Shinichi Tomioka, Osaka (JP); Atsuhisa Kageyama, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/718,604

(22) Filed: Dec. 18, 2012

(65) Prior Publication Data

US 2013/0107120 A1    May 2, 2013

Related U.S. Application Data

(63) Continuation of application No. PCT/JP2011/002245, filed on Apr. 15, 2011.

(30) Foreign Application Priority Data

Jun. 18, 2010   (JP) ................. 2010-139694

(51) Int. Cl.
| | | |
|---|---|---|
| H04N 5/46 | (2006.01) | |
| H04N 7/01 | (2006.01) | |
| G06T 7/40 | (2006.01) | |
| H04N 5/14 | (2006.01) | |
| G06T 7/00 | (2006.01) | |
| H04N 17/04 | (2006.01) | |
| H04N 5/44 | (2011.01) | |

(52) U.S. Cl.
CPC ............ *H04N 5/44* (2013.01); *H04N 7/0125* (2013.01); *G06T 7/403* (2013.01); *H04N 5/142* (2013.01); *G06T 7/0002* (2013.01); *H04N 17/04* (2013.01); *G06T 2207/30168* (2013.01)
USPC ........... 348/558; 348/524; 348/624; 348/625; 348/631; 348/650; 348/663; 348/687; 348/441; 348/443; 348/445; 348/450; 348/489; 348/490; 348/493; 348/396.1; 348/333.11; 348/208.4; 348/208.13; 348/237; 348/242; 348/252; 348/272; 348/297; 348/180; 348/34; 348/14.12; 348/712; 382/199; 382/200; 382/205; 382/266; 382/274; 382/275; 382/284; 382/295

(58) Field of Classification Search
USPC ......... 348/558, 445, 242, 624, 441, 272, 237, 348/524, 443, 450, 489, 490, 493, 625, 631, 348/650, 663, 687, 208.4, 208.13, 252, 297, 348/396.1, 333.11, 180, 34, 14.12, 712; 382/199, 266, 274, 275, 284, 200, 205, 382/295
See application file for complete search history.

(56) References Cited

U.S. PATENT DOCUMENTS 5,463,697 A  * 10/1995  Toda et al. .................... 382/199
6,570,616 B1 *  5/2003  Chen ............................ 348/272

(Continued)

FOREIGN PATENT DOCUMENTS

| JP | 2006-339934 A | 12/2006 |
|---|---|---|
| JP | 4193871 B2 | 12/2008 |

(Continued)

OTHER PUBLICATIONS

International Search Report mailed Jul. 26, 2011 issued in corresponding International Application No. PCT/JP2011/002245.

*Primary Examiner* — Jefferey Harold
*Assistant Examiner* — Mustafizur Rahman
(74) *Attorney, Agent, or Firm* — McDermott Will & Emery LLP

(57) ABSTRACT

It is determined whether or not an input image is an image converted from an image with a relatively low resolution based on one frame of an image. A resolution determination device includes: an edge strength calculator configured to obtain an edge strength of a pixel included in an input image based on luminance of the pixel and luminance of a pixel adjacent to the pixel, for each of a plurality of pixels included in the input image; and a resolution determiner configured to determine whether or not the input image is an image upconverted from an image with a predetermined resolution or less, based on distribution of the edge strengths.

11 Claims, 11 Drawing Sheets

(56) References Cited

U.S. PATENT DOCUMENTS

| | | |
|---|---|---|
| 2006/0274204 A1 | 12/2006 | Kimura et al. |
| 2007/0268400 A1 | 11/2007 | Kondo et al. |
| 2009/0009660 A1 | 1/2009 | Kageyama et al. |
| 2009/0028465 A1* | 1/2009 | Pan .............................. 382/300 |
| 2009/0041349 A1 | 2/2009 | Suzuki et al. |
| 2010/0226579 A1* | 9/2010 | Park et al. .................... 382/199 |
| 2011/0081094 A1* | 4/2011 | Damkat ........................ 382/254 |
| 2011/0085703 A1* | 4/2011 | Wiedemann et al. ......... 382/103 |

FOREIGN PATENT DOCUMENTS

| | | |
|---|---|---|
| JP | 2009-015025 A | 1/2009 |
| JP | 2009-044341 A | 2/2009 |

* cited by examiner

RESOLUTION DETERMINATION DEVICE, IMAGE PROCESSOR, AND IMAGE DISPLAY DEVICE

CROSS-REFERENCE TO RELATED APPLICATIONS

This is a continuation of PCT International Application PCT/JP2011/002245 filed on Apr. 15, 2011, which claims priority to Japanese Patent Application No. 2010-139694 filed on Jun. 18, 2010. The disclosures of these applications including the specifications, the drawings, and the claims are hereby incorporated by reference in their entirety.

BACKGROUND

The present disclosure relates to techniques for increasing the resolution of images.

Recent image display devices such as television receivers display high definition (HD) images in general. Specifically, in digital broadcasting, HD image signals are transmitted in many cases. HD images include an image upconverted from a conventionally used standard definition (SD) image and having the same number of pixels as that of an HD image. A technique for increasing the resolution of such an image is proposed in, for example, Japanese Patent Publication No. 2009-015025.

SUMMARY

In a case where a device itself upconverts an original image, the resolution of the original image is known, and thus a process for increasing the resolution of the upconverted image can be appropriately performed. However, in a case where an already upconverted image is received, information on the resolution of an original image is not received disadvantageously. In addition, the technique of Japanese Patent Publication No. 2009-015025, which increases the resolution of the upconverted image, cannot increase the resolution without using a plurality of frames of images.

It is therefore an object of the present disclosure to determine, based on one frame of an image, whether or not an input image is an image upconverted from an image with a relatively low resolution such as an SD image.

A resolution determination device in an aspect of the present disclosure includes: an edge strength calculator configured to obtain an edge strength of a pixel included in an input image based on luminance of the pixel and luminance of a pixel adjacent to the pixel, for each of a plurality of pixels included in the input image; and a resolution determiner configured to determine whether or not the input image is an image upconverted from an image with a predetermined resolution or less, based on distribution of the edge strengths, and output a determination result.

An image processor in an aspect of the present disclosure includes: an edge strength calculator configured to obtain an edge strength of a pixel included in an input image based on luminance of the pixel and luminance of a pixel adjacent to the pixel, for each of a plurality of pixels included in the input image; a resolution determiner configured to determine whether or not the input image is an image upconverted from an image with a predetermined resolution or less, based on distribution of the edge strengths; and a resolution enhancement processor configured to increase a resolution of the input image based on the determination result by the resolution determiner and output an input image with an increased resolution.

An image display device in an aspect of the present disclosure includes: the image processor; and a display device configured to display an image whose resolution is increased by the image processor.

In the above aspects of the present disclosure, it is possible to determine whether or not an input image is an image upconverted from an image with a predetermined resolution or less. Thus, the resolution can be appropriately increased in accordance with the resolution of the original image. In particular, the quality of an image upconverted from an image with a relatively low resolution such as an SD image can be enhanced.

Figure 12:
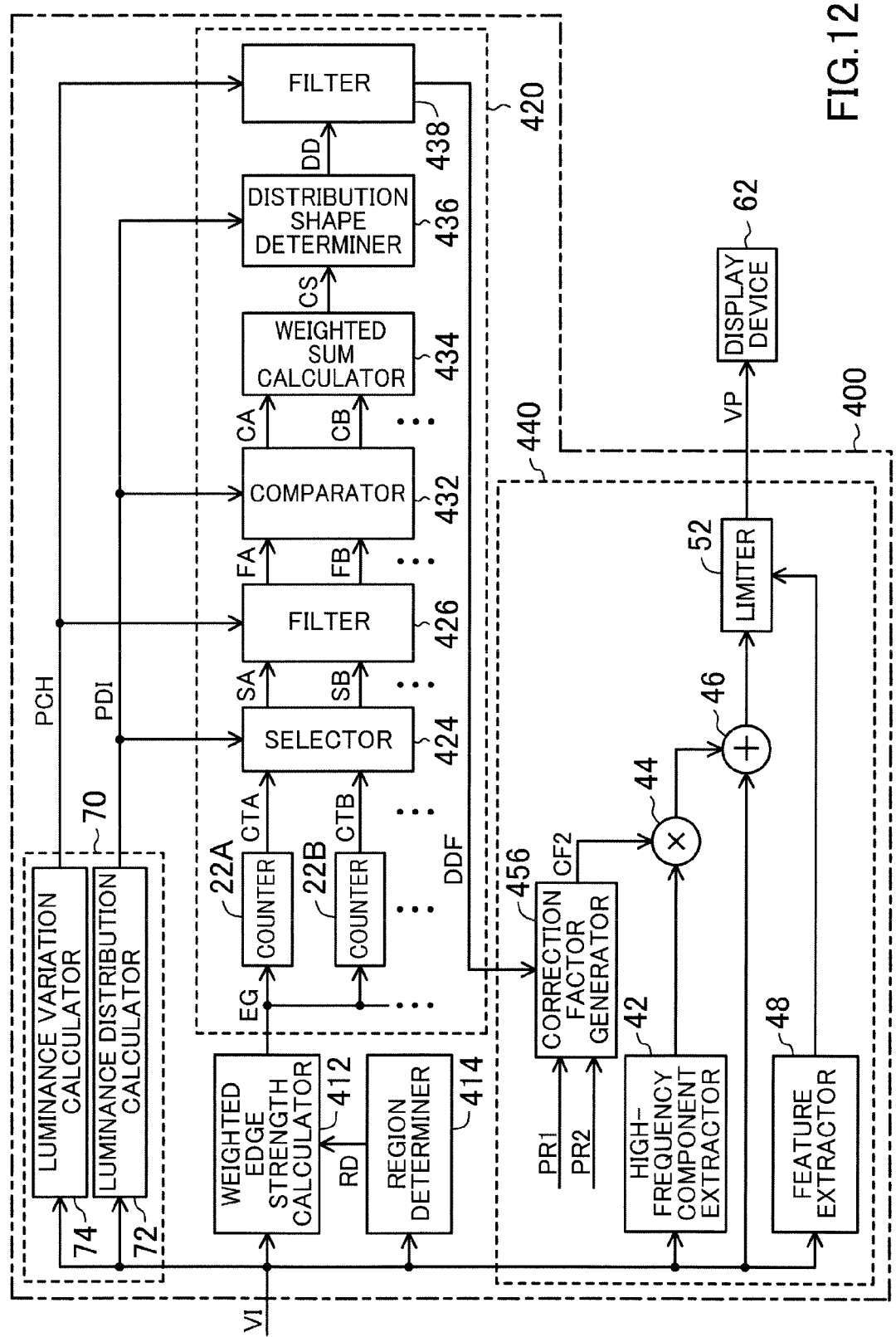
FIG. 12 is a block diagram illustrating another example of the configuration of the image display device of the embodiment.
Figure 15A:
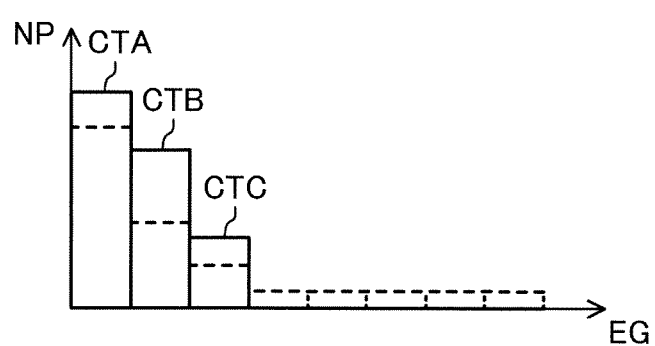
FIG. 15A is a histogram showing an example of distribution of edge strengths in the input image VI.
Figure 15B:
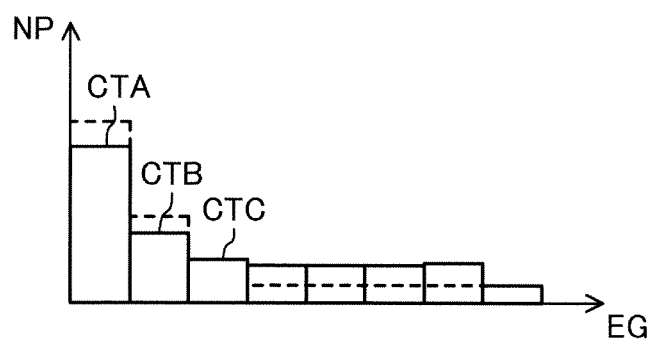
FIG. 15B is a histogram showing another example of the distribution of edge strengths in the input image VI.

16B shows an example of threshold values of the comparator illustrated in FIG. 12 in the case of FIG. 15B.

DETAILED DESCRIPTION

An embodiment of the present disclosure will be described hereinafter with reference to the drawings. In the drawings, reference numerals having the same last two digits designate the same or similar elements.

Figure 1:
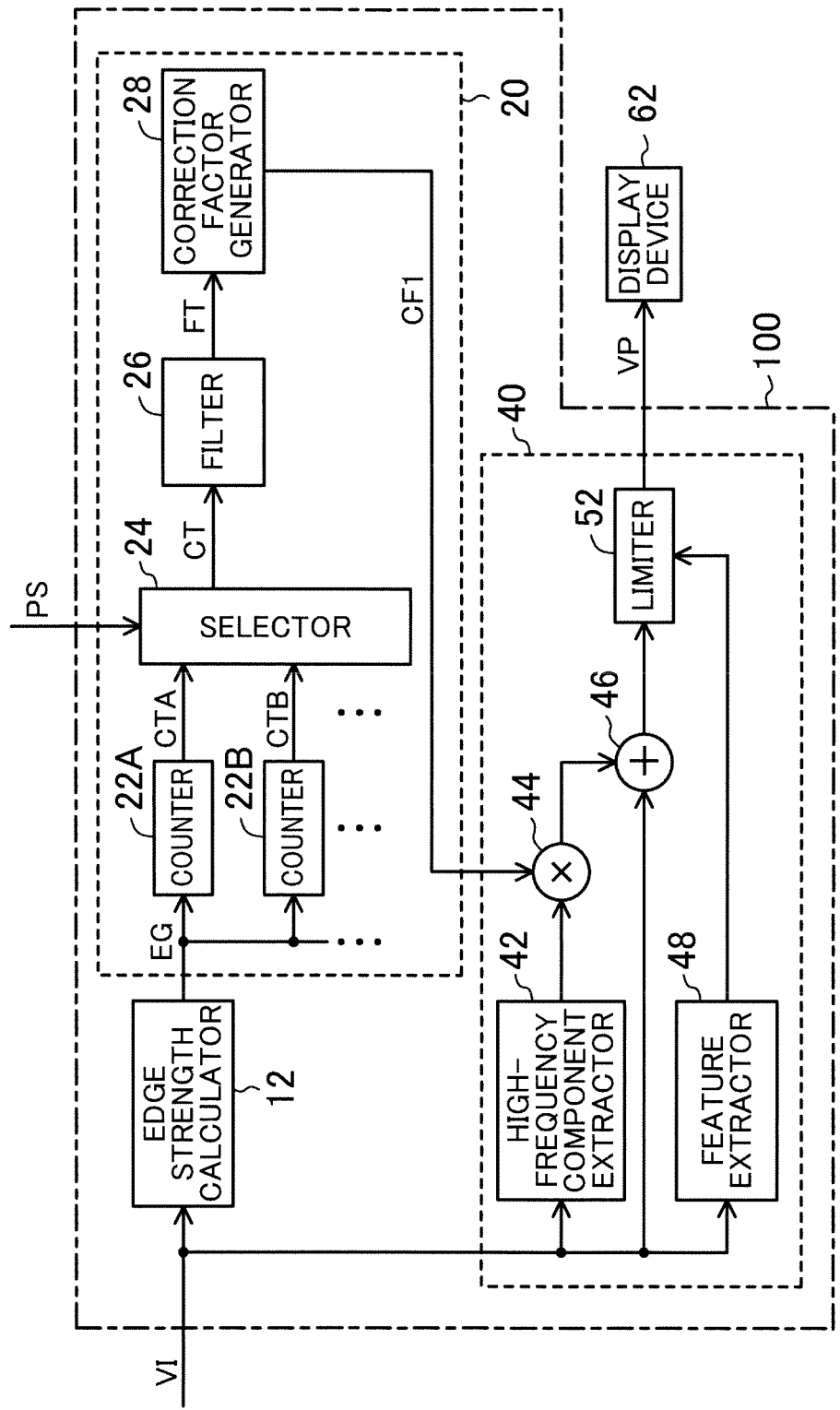
FIG. 1 is a block diagram illustrating an example of a configuration of an image display device according to an embodiment of the present disclosure.

FIG. 1 is a block diagram illustrating an example of a configuration of an image display device according to an embodiment of the present disclosure. The image display device illustrated in FIG. 1 includes an image processor 100 and a display device 62. The image processor 100 includes an edge strength calculator 12, a resolution determiner 20, and a resolution enhancement processor 40. The edge strength calculator 12 and the resolution determiner 20 serve as a resolution determination device.

The resolution determiner 20 includes counters 22A, 22B, . . . , a selector 24, a filter 26, and a correction factor generator 28. The resolution enhancement processor 40 includes a high-frequency component extractor 42, a multiplier 44, an adder 46, a feature extractor 48, and a limiter 52.

An input image VI is an HD image (e.g., 1080 p: a progressive image with 1080 effective scanning lines). The input image VI can be originally an HD image or can be an HD image upconverted from an original SD image (e.g., 480 p). The term "upconverting/upconverted" refers to conversion of an image with a relatively low resolution (e.g., an SD image) to an image with a larger number of pixels (e.g., an HD image).

Figure 2:
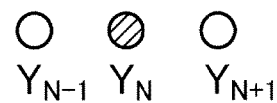
FIG. 2 illustrates an example of arrangement of pixels in an input image.

FIG. 2 illustrates an example of arrangement of pixels in the input image VI. The edge strength calculator 12 obtains an edge strength based on the luminance difference between a pixel and its adjacent pixel in the input image VI, and outputs the obtained edge strength to the counters 22A, 22B, . . . . With respect to a target pixel having a luminance $Y_N$ illustrated in FIG. 2, for example, the edge strength calculator 12 obtains, as an edge strength EG, an absolute value (i.e., $|Y_{N+1}-Y_N|$) of the difference between the luminance $Y_N$ of the target pixel and a luminance $Y_{N+1}$ of a pixel at the right of the target pixel. In the same manner, the edge strength calculator 12 obtains edge strengths EG for a plurality of pixels included in the input image VI, i.e., all the pixels in one frame of the input image VI, for example, and sequentially outputs the obtained edge strengths EG.

The resolution determiner 20 determines whether or not the input image VI is an image upconverted from an image having a predetermined resolution or less based on distribution of the edge strengths EG (i.e., a relationship between each edge strength and the number of pixels associated with the edge strength), and outputs the determination result. The following description is directed to an example in which the resolution determiner 20 determines whether or not the input image VI is an image upconverted from an image with a resolution less than or equal to that of an SD image.

Figure 3:
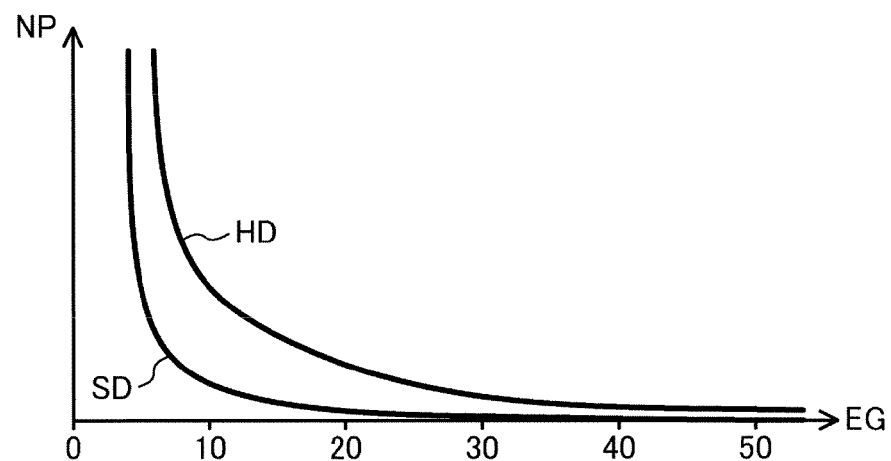
FIG. 3 is a graph showing an example of distribution of edge strengths in an input image VI.

FIG. 3 is a graph showing an example of distribution of edge strengths in the input image VI. As shown in FIG. 3, the distribution of edge strengths EG differs between an image (HD) that is originally an HD image and an image (SD) upconverted from an original SD image. For example, in a range where edge strengths EG are 11-20, the image that is originally an HD image has a larger number NP of pixels associated with this range than the image upconverted from an original SD image.

The counter 22A counts the number of pixels whose edge strengths EG are within a predetermined range, and outputs the obtained count CTA to the selector 24. In the same manner, each of the other counters 22B, . . . counts the number of pixels whose edge strengths EG are within a predetermined range for each counter, and outputs the obtained count, e.g., a count CTB, to the selector 24. Here, as an example, the counter 22A counts the number of pixels whose edge strengths EG are within the range of 11-20, and the counter 22B counts the number of pixels whose edge strengths EG are within the range of 21-30. The resolution determiner 20 may include a larger number of counters each configured to count the number of pixels whose edge strengths EG are within a range corresponding to larger strengths EG.

A range of edge strengths EG of pixels to be counted by each counter can be set in consideration of a possible range of the values of pixels. For example, in a case where the range where edge strengths EG are 128-1023 is divided into eight ranges, the resolution determiner 20 may include eight counters respectively counting the numbers of pixels associated with the eight ranges.

Figure 4:
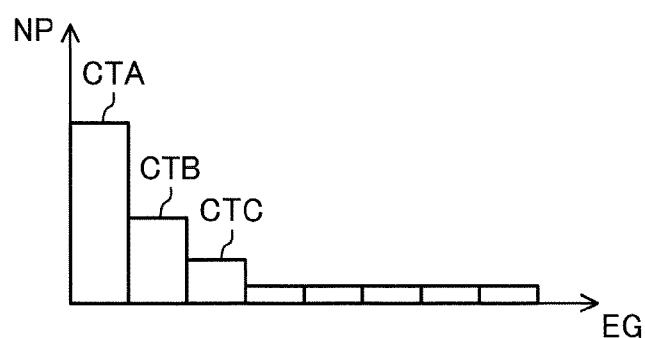
FIG. 4 is a histogram corresponding to the graph of FIG. 3.

FIG. 4 is a histogram corresponding to the graph of FIG. 3. In FIG. 4, the number NP of pixels is represented for each section of edge strengths EG with respect to HD in FIG. 3, for example. The numbers NP of pixels are represented in such a manner that the number of pixels (the count CTA) whose edge strengths EG are in the range of 11-20, the number of pixels (the count CTB) whose edge strengths EG are in the range of 21-30, and the number of pixels (the count CTC) whose edge strengths EG are in the range of 31-40, for example, are arranged in this order from the left of the graph.

The selector 24 selects one of the counts output from the counters 22A, 22B, . . . based on a parameter PS input from the outside of the resolution determiner 20, and outputs the selected count as a count CT to the filter 26. In this embodiment, it is assumed that the parameter PS is constant and the selector 24 selects the counter 22A, for simplicity.

The filter 26 smoothes the count selected by selector 24 along the time axis, and outputs the smoothed count FT to the correction factor generator 28. Suppose S1(n) is an input of the filter 26 and S2(n) is an output the filter 26, the following relationship is established:

$$S2(n)=\alpha S1(n)+(1-\alpha)S2(n-1)$$

where $\alpha$ is a real-number coefficient, n is a natural number, and (n) indicates that the signal is associated with the n-th pixel. The filter 26 is, for example, an infinite impulse response (IIR) filter, but may be another type of a filter for smoothing the input value along the time axis. The same holds for other filters, which will be described below.

Figure 5A:
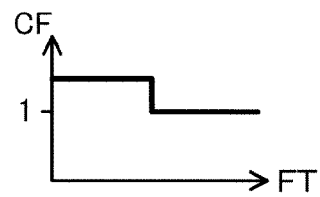
FIG. 5A is a graph showing an example of a relationship between an input value FT and an output value CF1 in a correction factor generator illustrated in FIG. 1.

FIG. 5A is a graph showing an example of a relationship between the input value FT and an output value CF1 in the correction factor generator 28 illustrated in FIG. 1. In accordance with the relationship shown in FIG. 5A, for example, the correction factor generator 28 generates a correction factor CF1 based on the count FT, and outputs the correction factor CF1 as a determination result to the multiplier 44. In this case, if the correction factor CF1 is larger than 1 (one), the input image VI is determined to be an image upconverted from an image with a resolution less than or equal to that of an SD image. On the other hand, if the correction factor CF1 is less than or equal to 1 (one), the input image VI is determined to be an image generated from an image with a resolution higher than that of an SD image.

Figure 5B:
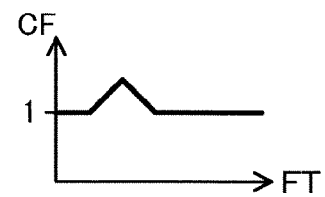
FIG. 5B is a graph showing another example of the relationship between the input value FT and the output value CF1.

FIG. 5B is a graph showing another example of the relationship between the input value FT and the output value CF1. The correction factor generator 28 may have a relationship shown in FIG. 5B, instead of that shown in FIG. 5A.

The resolution enhancement processor 40 increases the resolution of the input image VI based on the correction factor CF1, and outputs the obtained image VP to the display device 62. The resolution enhancement is, for example, an edge enhancement that is performed in the following manner.

Figure 6A:
FIG. 6A shows an example of luminance at an edge of the input image VI.
Figure 6B:
FIG. 6B shows luminance of an output of a high-frequency component extractor illustrated in FIG. 1 in correspondence with FIG. 6A.
Figure 6C:
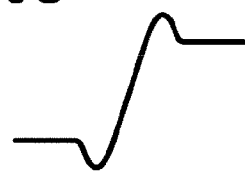
FIG. 6C shows luminance of an output of an adder illustrated in FIG. 1 in correspondence with FIG. 6A.
Figure 6D:
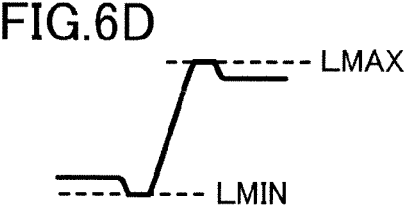
FIG. 6D shows luminance of an output of a limiter illustrated in FIG. 1 in correspondence with FIG. 6A.

FIG. 6A shows an example of luminance at an edge of the input image VI. In FIGS. 6A-6D, the abscissa represents the location of a pixel, and the ordinate represents the luminance. FIG. 6B shows luminance of an output of the high-frequency component extractor 42 illustrated in FIG. 1 in correspondence with FIG. 6A. FIG. 6C shows luminance of an output of the adder 46 illustrated in FIG. 1 in correspondence with FIG. 6A. FIG. 6D shows luminance of an output of the limiter 52 illustrated in FIG. 1 in correspondence with FIG. 6A.

The high-frequency component extractor 42 extracts a high-frequency component from the input image VI, and outputs the extracted high-frequency component. The high-frequency component extractor 42 outputs—$Y_{N-1}+2Y_N-Y_{N+1}$ with respect to a pixel with a luminance $Y_N$, for example. The output of the high-frequency component extractor 42 has a luminance as shown in FIG. 6B. The multiplier 44 multiplies the output of the high-frequency component extractor 42 by the correction factor CF1, and outputs the product to the adder 46. The adder 46 adds the output of the multiplier 44 to the input image VI, and outputs the result. The output of the adder 46 has a luminance as shown in FIG. 6C.

The feature extractor 48 obtains features of a pixel with a luminance $Y_N$, and outputs the features. The feature extractor 48 obtains a highest luminance LMAX and a minimum luminance LMIN as the features from the pixel with the luminance $Y_N$ and its adjacent eight pixels. The limiter 52 limits the luminance of an image obtained through the resolution enhancement described above to a range obtained based on the input image VI. Specifically, the limiter 52 limits a portion of the output of the adder 46 exceeding the luminance LMAX to a luminance LMAX, limits a portion of the output of the adder 46 below the luminance LMIN to a luminance LMIN, and outputs the resultant luminances LMAX and LMIN. The image VP subjected to the resolution enhancement and output from the limiter 52 is shown in FIG. 6D. The display device 62 includes a display panel, for example, and displays the image VP with an increased resolution.

The resolution enhancement is not limited to an edge enhancement. For example, the input image VI may be subjected to pattern detection and then replaced by an appropriate image in accordance with the result of the pattern detection. If the input image VI is determined to be an image upconverted from an image with a resolution less than or equal to that of an SD image (e.g., if the correction factor CF1 is larger than 1 (one)), the resolution enhancement processor 40 may generate an image with a larger number of quantization levels than those of the input image VI, and outputs the generated image.

In the foregoing description, it is assumed that the parameter PS is constant. Alternatively, the parameter PS may be changed as necessary. The parameter PS indicates the type of a device that has output the input image VI, for example. If the parameter PS indicates an optical disk recorder, it is known that the original image may have a low resolution. Thus, to perform determination using the number of pixels whose edge strengths EG are relatively low, the selector 24 selects the counter 22A. If the parameter PS indicates a tuner that receives a broadcast signal, the original image is likely to be an image with a high resolution. Thus, to perform determination using the number of pixels whose edge strengths EG are relatively high, the selector 24 selects the counter 22B.

Figure 7:
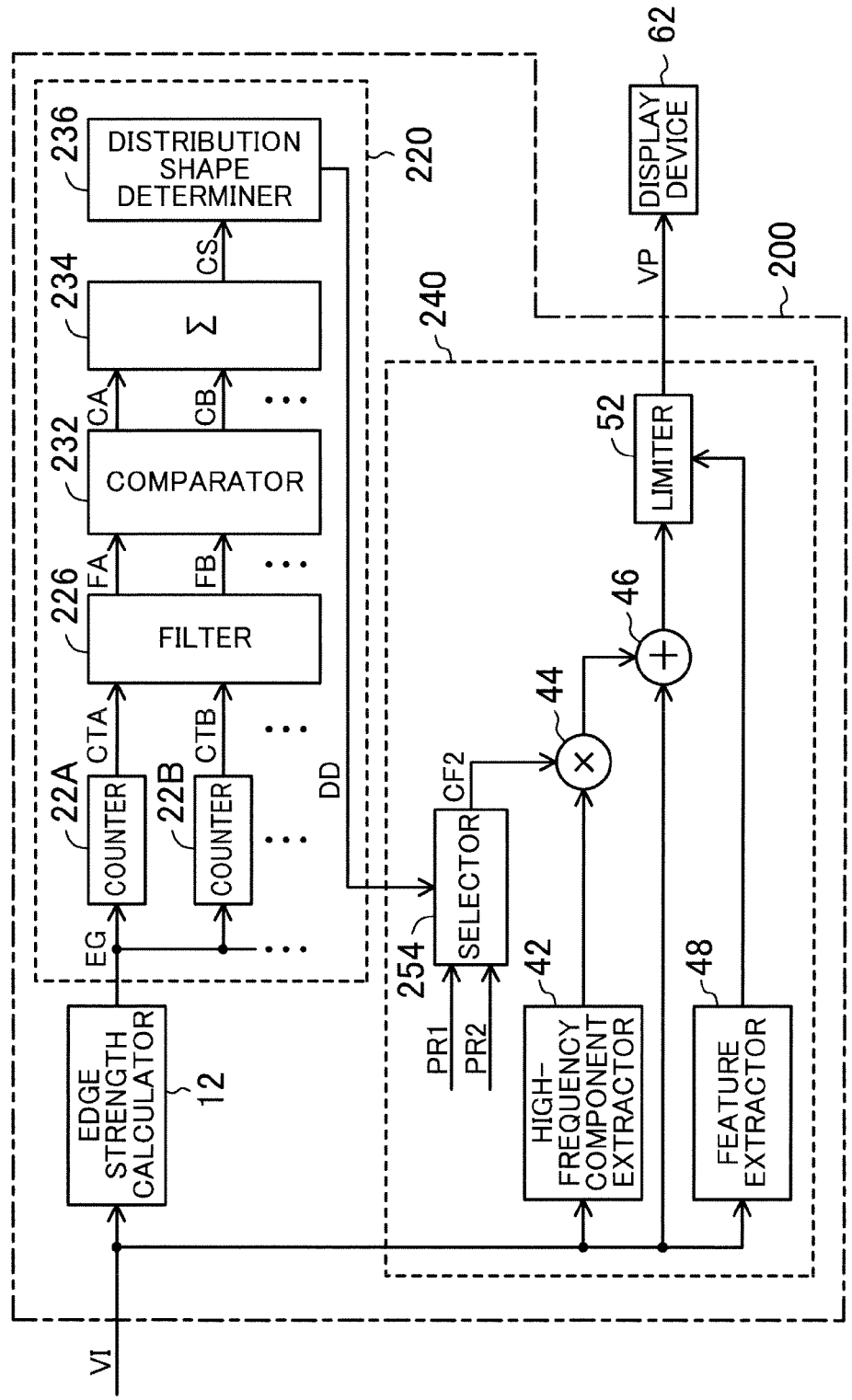
FIG. 7 is a block diagram illustrating another example of the configuration of the image display device of the embodiment.
Figure 8:
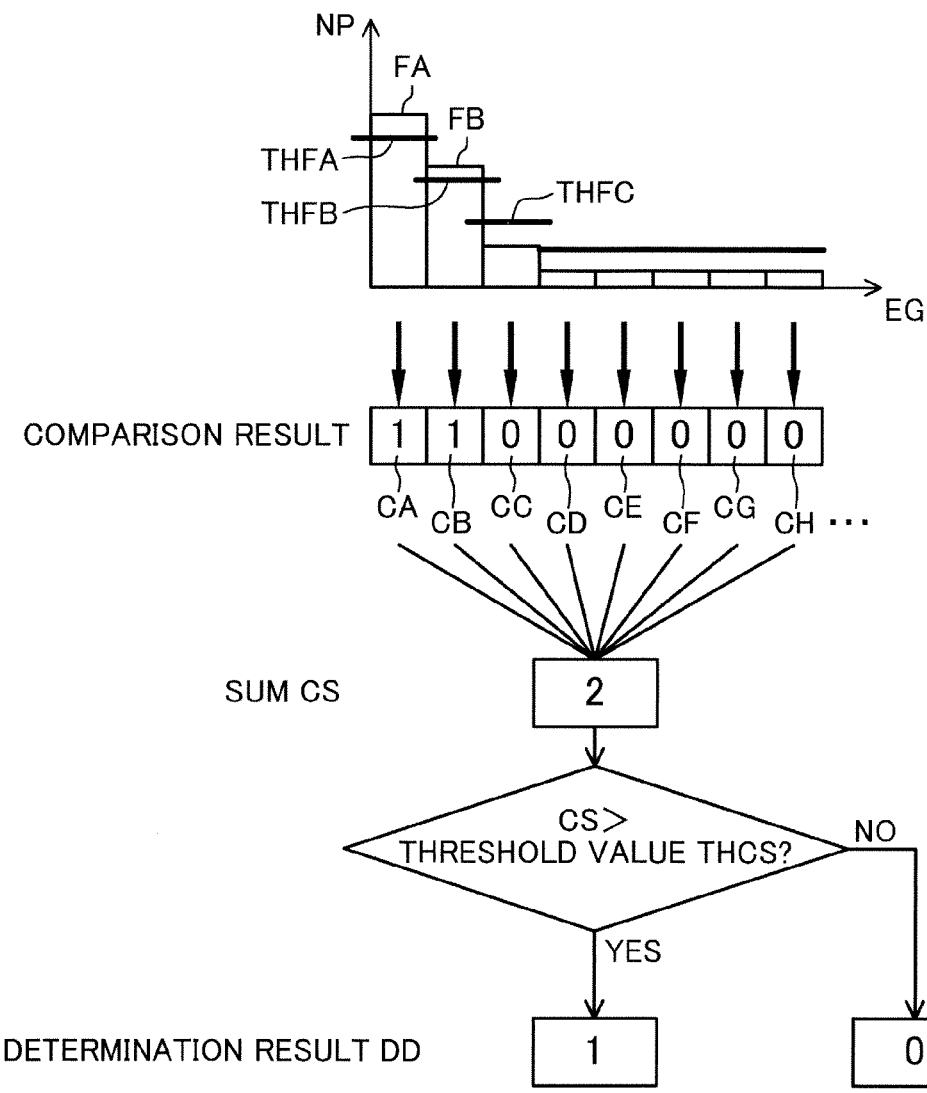
FIG. 8 schematically shows a process in a resolution determiner illustrated in FIG. 7.

FIG. 7 is a block diagram illustrating another example of the configuration of the image display device of the embodiment. The image display device illustrated in FIG. 7 includes an image processor 200 and a display device 62. The image processor 200 includes an edge strength calculator 12, a resolution determiner 220, and a resolution enhancement processor 240. The edge strength calculator 12 and the resolution determiner 220 serve as a resolution determination device. FIG. 8 schematically shows a process in the resolution determiner 220 illustrated in FIG. 7.

The resolution determiner 220 includes counters 22A, 22B, . . . , a filter 226, a comparator 232, a sum calculator 234, and a distribution shape determiner 236. The resolution enhancement processor 240 is the same as the resolution enhancement processor 40 illustrated in FIG. 1 except for additionally including a selector 254. The edge strength calculator 12 and the counters 22A, 22B, . . . are the same as those in the image display device illustrated in FIG. 1, and thus description thereof is not repeated.

In the same manner as the filter 26, the filter 226 smoothes a count CTA along the time axis, and outputs the smoothed count FA to the comparator 232. Similarly, the filter 226 smoothes a count CTB along the time axis, and outputs the smoothed count FB to the comparator 232. The same holds for counts of the other counters.

As shown in FIG. 8, the comparator 232 compares the count FA with a threshold value THFA associated with the count FA. For example, if the count FA is larger than the threshold value THFA, the comparator 232 outputs 1 (one), and otherwise outputs 0 (zero), as a comparison result value CA representing a comparison result, to the sum calculator 234. Similarly, the comparator 232 compares the count FB with a threshold value THFB associated with the count FB. If the count FB is larger than the threshold value THFB, the comparator 232 outputs 1 (one), and otherwise outputs 0 (zero), as a comparison result value CB representing a comparison result, to the sum calculator 234. The comparator 232 also compares the other counts, e.g., the count FC, with the associated threshold values, e.g., a threshold value THFC, and outputs comparison result values CC, CD, CE, CF, CG, and CH, for example, representing comparison results.

The sum calculator 234 obtains the sum CS of the comparison result values CA, CB, . . . , and outputs the sum CS to the distribution shape determiner 236. In the case illustrated in FIG. 8, the sum CS is 2. As illustrated in FIG. 8, the distribution shape determiner 236 compares the sum CS and a predetermined threshold value THCS. For example, if the sum CS is larger than the threshold value THCS, the distribution shape determiner 236 outputs 1 (one), and otherwise outputs 0 (zero), as a determination result DD. If the determination result DD is 0 (zero), the input image VI is determined to be an image upconverted from an image with a resolution less than or equal to that of an SD image. If the determination result DD is 1 (one), the input image VI is determined to be an image generated from an image with a resolution higher than that of an SD image.

The selector 254 selects an input parameter PR1 or PR2 based on the determination result DD, and outputs the selected parameter PR1 or PR2 as a correction factor CF2. For example, the parameters PR1 and PR2 are 1.0 and 1.5, respectively. If the determination result DD is 0 (zero), the selector 254 selects the parameter PR2. If the determination result DD is 1 (one), the selector 254 selects the parameter PR1. The other components of the resolution enhancement processor 240 except the selector 254 are the same as those of the resolution enhancement processor 40 illustrated in FIG. 1 except that the multiplier 44 multiplies the output of the high-frequency component extractor 42 by the correction factor CF2. Thus, description of these components is not repeated.

In the foregoing description, it is determined whether or not the input image VI is an image upconverted from an image with a resolution less than or equal to that of an SD image. Alternatively, it may also be determined whether or not the input image VI is an image with a resolution less than or equal to that of another image. In this case, the range of the luminance value to be counted by, for example, the counter 22A, the counter selected by the selector, the threshold value of the comparator 232, and the threshold value of the distribution shape determiner 236, for example, are changed to appropriate values.

As described above, in the image display devices illustrated in FIGS. 1 and 7, it is possible to determine whether or not the input image VI is an image converted from an image with a predetermined resolution or less based on one frame of an image. The resolution of the input image VI can be enhanced based on this determination result, thereby enabling processing appropriate for the image and, accordingly, displaying a high-quality image. Since determination can be performed based on one frame of an image, the circuit scale can be reduced and a determination result can be quickly obtained.

Figure 9:
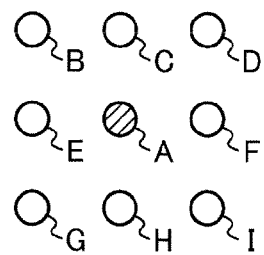
FIG. 9 illustrates a pixel whose edge strength is to be obtained by an edge strength calculator illustrated in FIG. 1 or 7 and its adjacent pixels.

FIG. 9 illustrates a pixel whose edge strength is to be obtained by the edge strength calculator 12 illustrated in FIG. 1 or 7 and its adjacent (surrounding) pixels. In the foregoing embodiment, the edge strength calculator 12 obtains the absolute value of the luminance difference between a pixel A and a pixel F in FIG. 9 as the edge strength EG. Alternatively, an edge strength may be obtained based on the luminance difference between the pixel A and another pixel adjacent to the pixel A.

In the same manner, the edge strength calculator 12 may obtain an edge strength EG between the pixel A and a pixel E, or an edge strength EG between the pixel A and a pixel C or between the pixel A and a pixel H, which are disposed vertically in FIG. 9. The edge strength calculator 12 may also obtain an edge strength EG between the pixel A and a pixel B, between the pixel A and a pixel D, between the pixel A and a pixel G, or between the pixel A and a pixel I, which are disposed in a slanting direction. The edge strength calculator 12 may calculate the absolute value of the luminance difference between the pixel A and each of the adjacent pixels B-I, and obtains the maximum value among the calculated absolute values as an edge strength EG.

Figure 10:
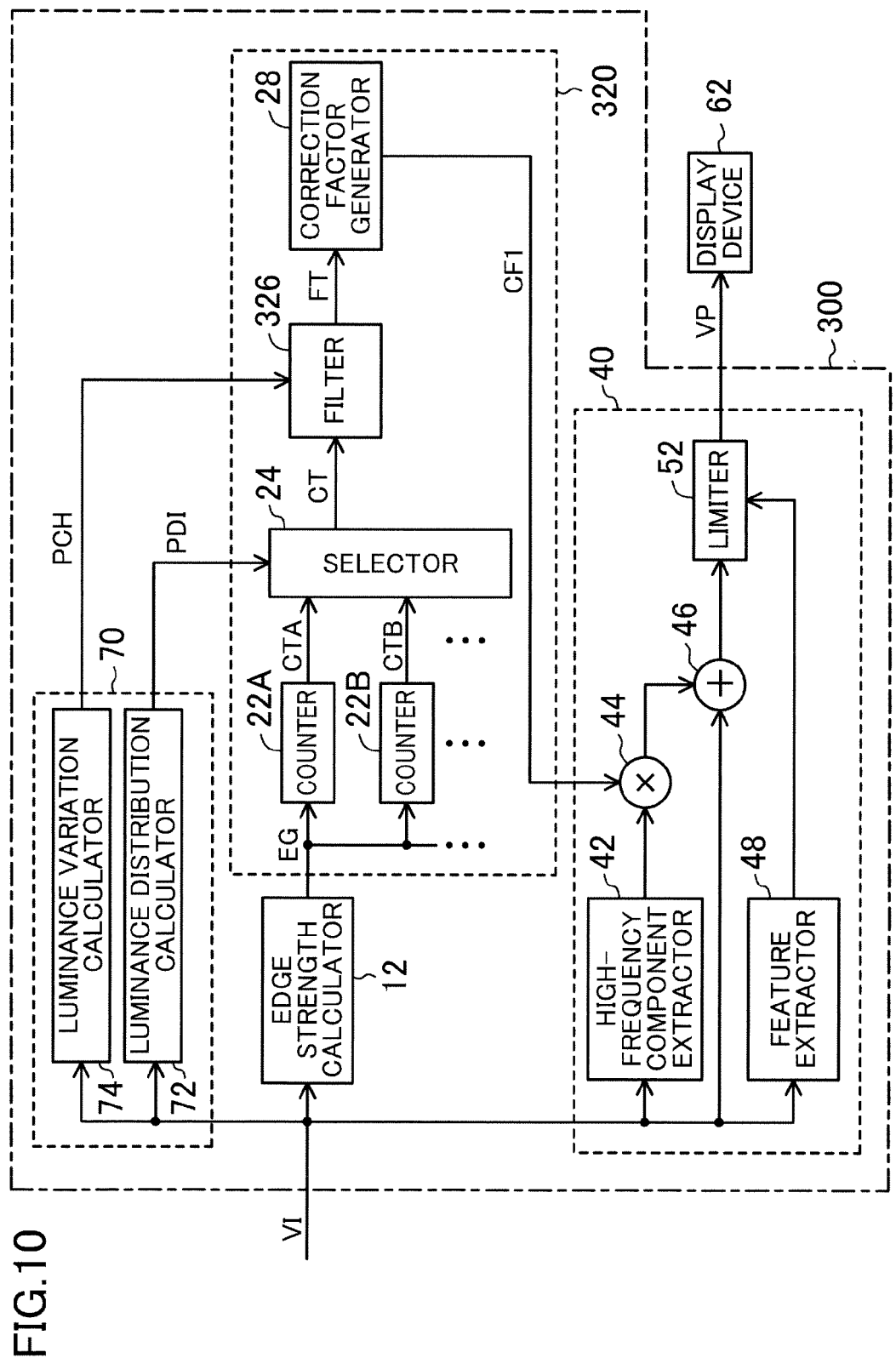
FIG. 10 is a block diagram illustrating another example of the configuration of the image display device of the embodiment.

FIG. 10 is a block diagram illustrating another example of the configuration of the image display device of the embodiment. The image display device illustrated in FIG. 10 includes an image processor 300 and a display device 62. The image processor 300 includes an edge strength calculator 12, a resolution determiner 320, a resolution enhancement processor 40, and a luminance feature calculator 70. The luminance feature calculator 70 includes a luminance distribution calculator 72 and a luminance variation calculator 74. The resolution determiner 320 has the same configuration as that of the resolution determiner 20 illustrated in FIG. 1 except for including a filter 326 instead of the filter 26. The edge strength calculator 12, the resolution determiner 320, and the luminance feature calculator 70 serve as a resolution determination device.

The luminance feature calculator 70 obtains features of the luminance of a frame of an input image VI. The features of the luminance include a luminance distribution value PDI and a luminance variation amount PCH. The resolution determiner 320 performs determination based on not only distribution of edge strengths but also the luminance. The luminance feature calculator 70 may include only one of the luminance distribution calculator 72 or the luminance variation calculator 74.

Figure 11A:
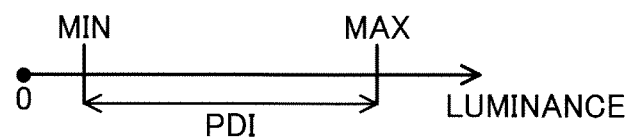
FIG. 11A shows an example of a luminance distribution value PDI obtained by a luminance distribution calculator illustrated in FIG. 10.

FIG. 11A shows an example of a luminance distribution value PDI obtained by the luminance distribution calculator 72 illustrated in FIG. 10. The luminance distribution calculator 72 obtains a luminance distribution value PDI corresponding to the width of luminance distribution of pixels in the frame of the input image VI. As illustrated in FIG. 11A, for example, the luminance distribution calculator 72 obtains the luminance distribution value PDI by:

PDI=(highest luminance in one frame)−(lowest luminance in one frame)

and then outputs the obtained luminance distribution value PDI to a selector 24.

Figure 11B:
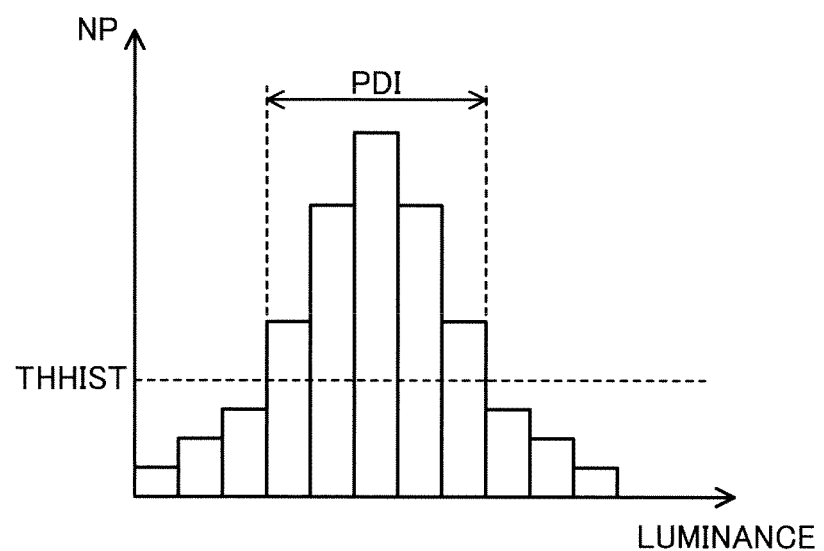
FIG. 11B shows another example of the luminance distribution value PDI obtained by the luminance distribution calculator illustrated in FIG. 10.

FIG. 11B shows another example of the luminance distribution value PDI obtained by the luminance distribution calculator 72 illustrated in FIG. 10. As shown in FIG. 11B, for example, the luminance distribution calculator 72 may obtain the width of a range where the luminances of pixels in the frame are concentrated, as a luminance distribution value PDI. In this case, the luminance distribution calculator 72 may, for example, include counters associated with sections in the histogram shown in FIG. 11B such that each of the counters counts the number of pixels, in one frame of the input image VI, whose luminances fall within the associated section. For example, the number of counters is 16, and the width of a section associated with each of the counters is 1/16 of an expected maximum value of the luminances. The luminance distribution calculator 72 obtains, as the luminance distribution value PDI, the number of counters whose count numbers are greater than or equal to a predetermined threshold value THHIST, and outputs the luminance distribution value PDI to the selector 24.

The selector 24 receives the luminance distribution value PDI as a parameter PS, selects, based on the luminance distribution value PDI, one of counts CTA, CTB, ... output from counters 22A, 22B, ..., and outputs the selected count as a count CT to the filter 326. For example, if the luminance distribution value PDI is less than a threshold value THDI, the selector 24 selects the count CTA, whereas if the luminance distribution value PDI is greater than or equal to the threshold value THDI, the selector 24 selects the count CTB.

The luminance variation calculator 74 obtains a luminance variation amount PCH that is the difference in average luminance between different frames of the input image VI. For example, the luminance variation calculator 74 obtains the luminance variation amount PCH by:

PCH=|(average luminance of target frame)−(average luminance of previous frame)| and outputs the obtained luminance variation amount PCH to the filter 326.

In the same manner as the filter 26, the filter 326 smoothes the count CT along the time axis. If the luminance variation amount PCH is less than a predetermined threshold value THCH, the filter 326 outputs the smoothed count FT to the correction factor generator 28. If the luminance variation amount PCH is greater than or equal to the predetermined threshold value THCH, the filter 326 does not smooth the count CT and outputs the count CT to the correction factor generator 28. In this case, the current count CT is output from the filter 326 without change.

When a video scene is switched, for example, the luminance variation amount PCH increases. In such a case, a delay by the filter 326 can be reduced. Accordingly, a correction factor CF1 (the determination result) is output from the correction factor generator 28 at a higher response speed.

FIG. 12 is a block diagram illustrating another example of the configuration of the image display device of the embodiment. The image display device illustrated in FIG. 12 includes an image processor 400 and a display device 62. The image processor 400 includes a weighted edge strength calculator 412, a region determiner 414, a resolution determiner 420, a resolution enhancement processor 440, and a luminance feature calculator 70. The weighted edge strength calculator 412, the region determiner 414, the resolution determiner 420, and the luminance feature calculator 70 serve as a resolution determination device.

The resolution determiner 420 includes counters 22A, 22B, ..., a selector 424, filters 426 and 438, a comparator 432, a weighted sum calculator 434, and a distribution shape determiner 436. The resolution enhancement processor 440 is the same as the resolution enhancement processor 40 illustrated in FIG. 1 except for additionally including a correction factor calculator 456. The counters 22A, 22B, ... are the same as those in the image display device illustrated in FIG. 1, and thus description thereof is not repeated.

Figure 13A:
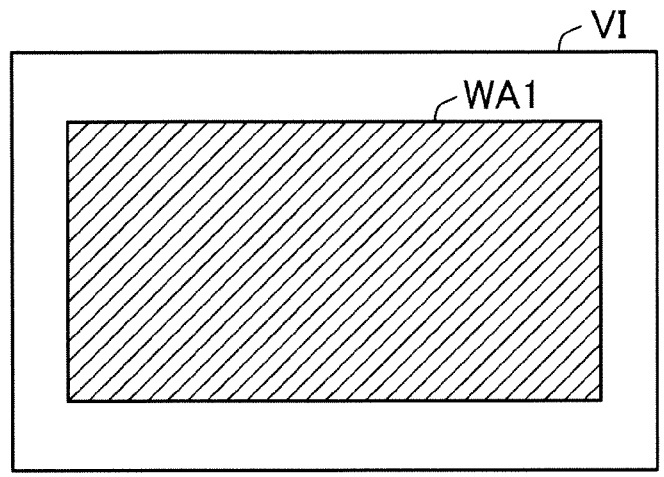
FIG. 13A is a view illustrating an example of a region where edge strengths are to be obtained.
Figure 13B:
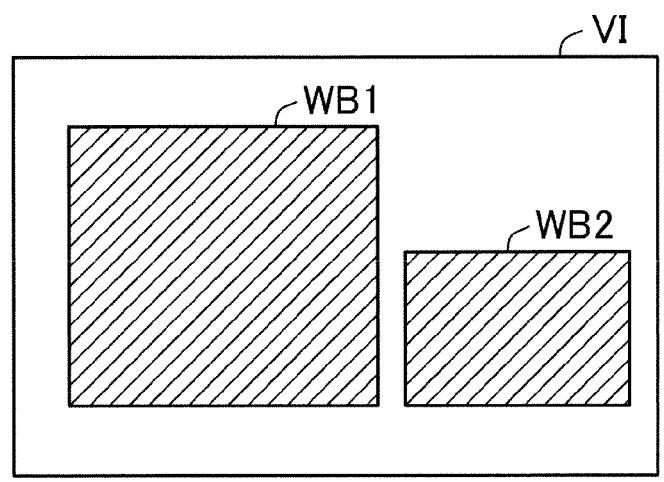
FIG. 13B is a view illustrating another example of the region where edge strengths are to be obtained.

FIG. 13A is a view illustrating an example of a region where edge strengths are to be obtained. FIG. 13B is a view illustrating another example of the region where edge strengths are to be obtained. The region determiner 414 outputs a region determination result RD indicating that the region used for determination is a region where edge strengths are to be obtained basically with respect to the entire input image VI (e.g. 1920×1080 pixels). When the region where edge strengths are to be obtained is specified, the region determiner 414 performs the following operation.

For example, in a case where a region WA1 as illustrated in FIG. 13A is specified as a region where edge strengths are to be obtained, the region determiner 414 determines whether or not a pixel in the input image VI is a pixel in the region WA1, and outputs the region determination result RD to the weighted edge strength calculator 412. The region determiner 414 outputs 1 (one) if the pixel in the input image VI is a pixel in the region WA1, and otherwise outputs 0 (zero), as the region determination result RD. In a case where regions WB1 and WB2 as illustrated in FIG. 13B are specified, the region determiner 414 determines whether or not a pixel in the input image VI is a pixel in one of the regions WB1 or WB2.

Figure 14:
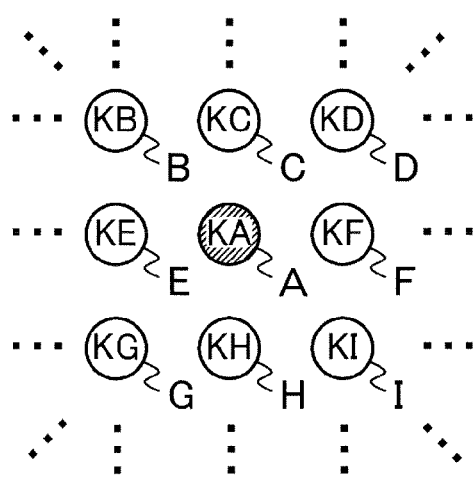
FIG. 14 illustrates a pixel whose edge strength is to be obtained by a weighted edge strength calculator illustrated in FIG. 12 and its adjacent pixels.

FIG. 14 illustrates a pixel whose edge strength is to be obtained by the weighted edge strength calculator 412 illustrated in FIG. 12 and its adjacent pixels. Pixels A, B, C, D, E, F, G, H, and I are respectively associated with coefficients KA, KB, KC, KD, KE, KF, KG, KH, and KI. The coefficients KA, ..., and KI are associated with locations relative to the pixel A whose edge strength is to be obtained.

The weighted edge strength calculator 412 obtains an edge strength EG based on the luminance of a pixel in the input image VI and the luminance of its adjacent pixel, and outputs the obtained edge strength EG to the counters 22A, 22B, ... based on the region determination result RD of the region determiner 414. The edge strength calculator 412 outputs the obtained edge strength EG if the region determination result RD indicates that the pixel is in a range of pixels whose edge strengths are to be obtained (e.g., RD=1), and otherwise outputs 0 (zero), as an edge strength EG.

In obtaining an edge strength of the pixel A in FIG. 14, for example, the edge strength calculator 412 assigns weights to the values of the pixel A and its adjacent pixels B-I, and adds these weighted values together. Suppose the pixels A, B, C, D, E, F, G, H, and I respectively have luminance values YA, YB, YC, YD, YE, YF, YG, YH, and YI, the edge strength calculator 412 obtains an edge strength EG by:

$$EG = |KA \cdot YA + KB \cdot YB + KC \cdot YC + KD \cdot YD + KE \cdot YE + KF \cdot YF + KG \cdot YG + KH \cdot YH + KI \cdot YI|$$

For example, if $$KA=2, KE=KF=-1,$$

then $$KB=KC=KD=KG=KH=KI=0, EG=|-YE+2YA-YF|.$$

In this case, advantages as a bypass filter can be obtained. Thus, edge strengths of components with higher frequencies in the input image VI can be obtained with stability.

Since the region determiner 414 performs determination and the edge strength calculator 412 uses the region determination result RD, influences of portions to be removed, e.g., side panels as margins at the left and right side of an image, a margin in a letterbox format, and a boundary formed when compositing images, can be removed from a target of resolution determination.

The selector 424 selects a predetermined number of counts from counts CTA, CTB, ... output from the counters 22A, 22B, ... based on the luminance distribution value PDI, and outputs the selected values as counts SA, SB, ... to the filter 426. For example, selector 424 selects eight counts CTA, CTB, ... if the luminance distribution value PDI is less than the threshold value THDI, and selects eight counts CTB, CTC, ... if the luminance distribution value PDI is greater than or equal to the threshold value THDI. The selector 424 may select the counts from all the counters 22A, 22B, ....

The filter 426 smoothes the input counts SA, SB, ... along the time axis. If the luminance variation amount PCH is less than the predetermined threshold value THCH, the filter 426 outputs the smoothed counts FA, FB, ... to the comparator 432. If the luminance variation amount PCH is greater than or equal to the predetermined threshold value THCH, the filter 426 does not smooth the input counts SA, SB, ..., and outputs the counts SA, SB, ... to the comparator 432. In this case, the current count is output from the filter 426 without change.

In the same manner as that illustrated in FIG. 8, for example, the comparator 432 compares the count FA with the associated threshold value THFA, outputs 1 (one) if the count FA is greater than the threshold value THFA, and otherwise outputs 0 (zero), as a comparison result value CA representing a comparison result, to the sum calculator 434. Similarly, the comparator 432 compares the count FB with the associated threshold value THFB, outputs 1 (one) if the count FB is greater than the threshold value THFB, and otherwise outputs 0 (zero), as a comparison result value CB representing a comparison result, to the sum calculator 434. The comparator 432 also compares the other counts with the associated threshold values, and outputs comparison result values representing comparison results. The comparator 432 controls the threshold values THFA, THFB, THFC, ... based on the luminance distribution value PDI.

Figure 16A:
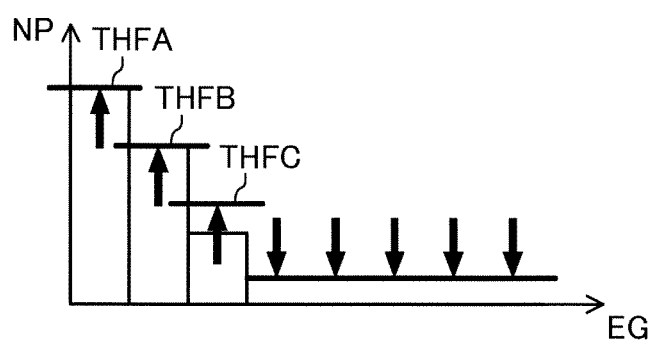
FIG. 16A shows an example of threshold values of a comparator illustrated in FIG. 12 in the case of FIG. 15A. FIG.

FIG. 15A is a histogram showing an example of distribution of edge strengths in the input image VI. FIG. 15B is a histogram showing another example of the distribution of edge strengths in the input image VI. FIG. 15A shows a case where the input image VI is relatively dark and the range of luminance distribution is narrow (i.e., the luminance distribution value PDI is small). FIG. 15B shows a case where the input image VI is relatively bright and the range of luminance distribution is wide (i.e., the luminance distribution value PDI is large). FIG. 16A shows an example of threshold values of the comparator 432 illustrated in FIG. 12 in the case of FIG.

Figure 16B:
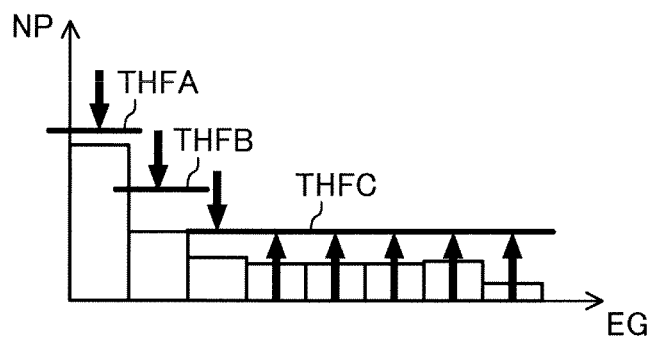

15A. FIG. 16B shows an example of threshold values of the comparator 432 illustrated in FIG. 12 in the case of FIG. 15B.

In the case of FIG. 15A, the comparator 432 increases threshold values associated with relatively low edge strengths and reduces threshold values associated with relatively high edge strengths, based on the luminance distribution value PDI (see FIG. 16A). In the case of FIG. 15B, the comparator 432 reduces threshold values associated with relatively low edge strengths and increases threshold values associated with relatively high edge strengths, based on the luminance distribution value PDI (see FIG. 16B). In this manner, the threshold values are controlled based on the luminance distribution value PDI. Thus, the comparator 432 can perform stable comparison independent of variations of luminance.

The sum calculator 434 assigns weights to the comparison result values CA, CB, ..., then adds these weighted values together, and outputs the obtained sum to the distribution shape determiner 436. Specifically, the sum calculator 434 individually multiplies the values CA, CB, ... by their associated coefficients, and obtains the sum CS of the products. For example, the sum calculator 434 multiples a comparison result associated with a higher edge strength by a larger coefficient, so that this comparison result has priority to other comparison results. By assigning weights in the above-described manner, the influence of the values useful for determining the distribution shape can be enhanced. The sum calculator 434 may set the coefficients associated with all the values CA, CB, ... at 1 (one).

If the luminance distribution value PDI is greater than or equal to a predetermined threshold value THJU, the distribution shape determiner 436 compares the sum CS obtained by the sum calculator 434 with the predetermined threshold value THCS. If the sum CS is greater than the predetermined threshold value THCS, the distribution shape determiner 436 outputs 1 (one), and otherwise outputs 0 (zero), as a determination result DD. In the same manner as that illustrated in FIG. 7, if the determination result DD is 0 (zero), the input image VI is determined to be an image upconverted from an image with a resolution less than or equal to that of an SD image, whereas if the determination result DD is 1 (one), the input image VI is determined to be an image based on an image with a resolution higher than that of an SD image. If the luminance distribution value PDI is less than the predetermined threshold value THJU, the distribution shape determiner 436 does not perform determination, and outputs the previously obtained determination result DD. In a case where the number of counters satisfying predetermined conditions out of 16 counters is used as the luminance distribution value PDI as illustrated in FIG. 11B, the threshold value THJU is set at, for example, 8.

The filter 438 smoothes the determination result DD output from the distribution shape determiner 436 along the time axis. If the luminance variation amount PCH is less than a predetermined threshold value THCH2, the filter 438 outputs the smoothed determination result DDF to the correction factor calculator 456. If the luminance variation amount PCH is greater than or equal to the predetermined threshold value THCH2, the filter 438 does not smooth the input determination result DDF, and outputs the input determination result DDF to the correction factor calculator 456. In this case, the current determination result DDF is output from the filter 438 without change.

The correction factor calculator 456 obtains a correction factor CF2 based on the determination result DDF, and outputs the correction factor CF2 to the multiplier 44. Specifically, the correction factor calculator 456 obtains the correction factor CF2 by:

$$CF2=(1-\beta)\cdot PR1+\beta\cdot PR2$$

where $\beta$=DDF. With the correction factor calculator 456, the correction factor CF2 is allowed to continuously change between the parameters PR1 and PR2, thereby reducing flicker caused by switching of the parameters.

The functional blocks of this embodiment can be typically implemented as hardware. For example, each functional block can be formed on a semiconductor substrate as a part of an integrated circuit (IC). Here, an IC includes a large-scale integrated (LSI) circuit, an application-specific integrated circuit (ASIC), a gate array, a field programmable gate array (FPGA), etc. Alternatively, part or all of each of the functional blocks can be implemented as software. For example, such a functional block can be implemented as a program that is executed on a processor. In other words, each functional block described in this embodiment may be implemented as hardware, software, or a combination of hardware and software.

As described above, in this embodiment, it is possible to determine whether or not an input image is an image upconverted from an image with a predetermined resolution or less. Thus, the present disclosure is useful for resolution determination devices, image processors, and image display devices, for example.

What is claimed is:

1. A resolution determination device, comprising:
   an edge strength calculator configured to obtain an edge strength of a pixel included in an input image based on luminance of the pixel and luminance of a pixel adjacent to the pixel, for each of a plurality of pixels included in the input image; and
   a resolution determiner configured to determine whether or not the input image is an image upconverted from an image with a predetermined resolution or less, based on distribution of the edge strengths, and output a determination result,
   wherein the resolution determiner includes:
      a first counter configured to generate a count representing the number of pixels whose edge strengths are within a first range;
      a second counter configured to generate a count representing the number of pixels whose edge strengths are within a second range;
      a selector configured to select and output the count of the first counter or the second counter based on an input parameter; and
      a correction factor generator configured to generate a correction factor based on the count selected by the selector and output the correction factor as the determination result.

2. A resolution determination device, comprising:
   an edge strength calculator configured to obtain an edge strength of a pixel ncluded in an input image based on luminance of the pixel and luminance of a pixel adjacent to the pixel, for each of a plurality of pixels included in the input image; and
   a resolution determiner configured to determine whether or not the input image is an image upconverted from an image with a predetermined resolution or less, based on distribution of the edge strengths, and output a determination result, wherein the resolution determiner includes:
a plurality of counters, each of which is configured to generate a count representing the number of pixels whose edge strengths are within a range corresponding thereto;
a comparator configured to compare each of the counts of the counters with a corresponding one of the threshold values and output comparison result values representing comparison results;
a sum calculator configured to obtain a sum of the comparison result values; and
a distribution shape determiner configured to compare the sum with a predetermined threshold value and output a comparison result as the determination result.

3. The resolution determination device of claim 2, wherein the resolution determiner further includes a filter configured to smooth the count of each of the counters along the time axis, and
the comparator compares the count of each of the counters smoothed by the filter with the associated threshold value.

4. The resolution determination device of claim 2, wherein the resolution determiner further includes a filter configured to smooth the comparison result of the distribution shape determiner along the time axis and output the smoothed comparison result as the determination result.

5. A resolution determination device, comprising:
an edge strength calculator configured to obtain an edge strength of a pixel included in an input image based on luminance of the pixel and luminance of a pixel adjacent to the pixel, for each of a plurality of pixels included in the input image;
a resolution determiner configured to determine whether or not the input image is an image upconverted from an image with a predetermined resolution or less, based on distribution of the edge strengths, and output a determination result; and
a luminance feature calculator configured to obtain a feature of luminance for a frame of the input image,
wherein the resolution determiner also performs the determination on the feature of the luminance.

6. The resolution determination device of claim 5, wherein the luminance feature calculator includes a luminance variation calculator configured to obtain, as the feature, a luminance variation amount that is a difference in average luminance between different frames of the input image,
the resolution determiner includes:
a counter configured to generate a count representing the number of pixels whose edge strengths are within a predetermined range;
a filter configured to smooth the count along the time axis and output the smoothed count; and
a correction factor generator configured to generate a correction factor based on the smoothed count output from the filter and output the correction factor as the determination result, and
the filter outputs the smoothed count if the luminance variation amount is less than a predetermined value, whereas the filter outputs the count without smoothing if the luminance variation amount is greater than or equal to the predetermined value.

7. The resolution determination device of claim 5, wherein the luminance feature calculator includes a luminance variation calculator configured to obtain, as the feature, a luminance variation amount that is a difference in average luminance between different frames of the input image,
the resolution determiner includes:
a plurality of counters, each of which is configured to generate a count representing the number of pixels whose edge strengths are within a range corresponding thereto;
a filter configured to smooth the counts of the counters along the time axis and output the smoothed counts;
a comparator configured to compare each of the smoothed counts output from the filter with a corresponding one of the threshold values and output comparison result values representing comparison results;
a sum calculator configured to obtain a sum of either the comparison result values or weighted comparison result values obtained by assigning weights to the comparison result values; and
a distribution shape determiner configured to compare the sum with a predetermined threshold value and output a comparison result as the determination result, and
the filter outputs the smoothed counts if the luminance variation amount is less than a predetermined value, whereas the filter outputs the counts without smoothing if the luminance variation amount is greater than or equal to the predetermined value.

8. The resolution determination device of claim 5, wherein the luminance feature calculator includes a luminance distribution calculator configured to obtain, as the feature, a luminance distribution value corresponding to a width of luminance distribution of pixels in the frame of the input image,
the resolution determiner includes:
a first counter configured to generate a count representing the number of pixels whose edge strengths are within a first range;
a second counter configured to generate a count representing the number of pixels whose edge strengths are within a second range;
a selector configured to select and output the count of the first counter if the luminance distribution value is less than a predetermined value, and select and output the count of the second counter if the luminance distribution value is greater than or equal to the predetermined value; and
a correction factor generator configured to generate a correction factor based on the count selected by the selector and output the correction factor as the determination result, and
the first range has a maximum value less than or equal to a minimum value of the second range.

9. The resolution determination device of claim 5, wherein the luminance feature calculator includes a luminance distribution calculator configured to obtain, as the feature, a luminance distribution value corresponding to a width of luminance distribution of pixels in the frame of the input image,
the resolution determiner includes:
a plurality of counters, each of which is configured to generate a count representing the number of pixels whose edge strengths are within a range corresponding thereto;
a comparator configured to compare each of the counts of the counters with a corresponding one of the threshold values and output comparison result values representing comparison results;

a sum calculator configured to obtain a sum of the comparison result values or weighted comparison result values obtained by assigning weights to the comparison result values; and a distribution shape determiner configured to compare the sum with a predetermined threshold value and output a comparison result as the determination result, and the comparator sets threshold values in a plurality of sections based on the luminance distribution value.

10. The resolution determination device of claim 5, wherein the luminance feature calculator includes a luminance distribution calculator configured to obtain, as the feature, a luminance distribution value corresponding to a width of luminance distribution of pixels in the frame of the input image, the resolution determiner includes:
 a plurality of counters, each of which is configured to generate a count representing the number of pixels whose edge strengths are within a range corresponding thereto;
 a comparator configured to compare each of the counts of the counters with a corresponding one of the threshold values and output comparison result values representing comparison results;
 a sum calculator configured to obtain a sum of the comparison result values or weighted comparison result values obtained by assigning weights to the comparison result values; and
 a distribution shape determiner configured to compare the sum with a predetermined threshold value, output a comparison result as the determination result if the luminance distribution value is greater than or equal to a predetermined value, and output a previously obtained comparison result as the determination result if the luminance distribution value is less than the predetermined value.

11. An image processor, comprising:
an edge strength calculator configured to obtain an edge strength of a pixel included in an input image based on luminance of the pixel and luminance of a pixel adjacent to the pixel, for each of a plurality of pixels included in the input image;

a resolution determiner configured to determine whether or not the input image is an image upconverted from an image with a predetermined resolution or less, based on distribution of the edge strengths; and a resolution enhancement processor configured to increase a resolution of the input image based on the determination result by the resolution determiner and output an input image with an increased resolution, wherein the resolution determiner includes:
 a plurality of counters, each of which is configured to generate a count representing the number of pixels whose edge strengths are within a range corresponding thereto;
 a comparator configured to compare each of the counts of the counters with a corresponding one of the threshold values and output comparison result values representing comparison results;
 a sum calculator configured to obtain a sum of the comparison result values;
 a distribution shape determiner configured to compare the sum with a predetermined threshold value and output a comparison result; and
 a filter configured to smooth the comparison result of the distribution shape determiner along the time axis and output the smoothed comparison result as the dete nation result.

* * * * *